(12) United States Patent
Pontes et al.

(10) Patent No.: US 9,194,174 B2
(45) Date of Patent: Nov. 24, 2015

(54) STRUCTURAL ARRANGEMENT FOR ACCESS WINDOW TO FUEL TANK WITH COMPOSITE COATING

(71) Applicant: EMBRAER S.A., São José dos Campos/SP (BR)

(72) Inventors: Aroldo Pontes, São José dos Campos/SP (BR); Danilo Seixas Victorazzo, São José dos Campos/SP (BR); Douglas Carrari Firmino, São José dos Campos/SP (BR); Erich Robert Schaay, São José dos Campos/SP (BR); Fabiano Lobato, São José dos Campos/SP (BR); Flavio Yoiti Sasaki, São José dos Campos/SP (BR); Sidney Osses Nunes, São José dos Campos/SP (BR); Silvio Luiz Francisco Osorio, São José dos Campos/SP (BR)

(73) Assignee: EMBRAER S.A., São Joseé Dos Campos-SP (BR)

( * ) Notice: Subject to any disclaimer, the term of this patent is extended or adjusted under 35 U.S.C. 154(b) by 286 days.

(21) Appl. No.: 13/729,416

(22) Filed: Dec. 28, 2012

(65) Prior Publication Data

US 2013/0205667 A1    Aug. 15, 2013

(30) Foreign Application Priority Data

Dec. 28, 2011   (BR) ..................................... 1105342

(51) Int. Cl.
*H05F 3/00* (2006.01)
*E06B 5/10* (2006.01)
*B64C 3/34* (2006.01)
*B64D 37/32* (2006.01)
*B64C 1/14* (2006.01)

(52) U.S. Cl.
CPC ................. *E06B 5/10* (2013.01); *B64C 1/1446* (2013.01); *B64C 3/34* (2013.01); *B64D 37/32* (2013.01)

(58) Field of Classification Search
USPC ........................... 361/218; 220/327, 328, 378
See application file for complete search history.

(56) References Cited

U.S. PATENT DOCUMENTS

| | | | | | |
|---|---|---|---|---|---|
| 2,635,785 | A | * | 4/1953 | Gross | 220/328 |
| 4,428,867 | A | * | 1/1984 | Billias et al. | 252/512 |
| 4,530,443 | A | * | 7/1985 | Gorges | 220/327 |
| 4,579,248 | A | * | 4/1986 | Gorges | 220/327 |
| 5,316,167 | A | * | 5/1994 | Kay | 220/328 |

(Continued)

*Primary Examiner* — Ronald W Leja
(74) *Attorney, Agent, or Firm* — Nixon & Vanderhye P.C.

(57) ABSTRACT

There is disclosed a structural arrangement (10) for an access window (30) to a fuel tank (20) with composite coating (40), this structural arrangement (10) comprising an external lid (11) associated to the access window (30) by fastening means (12), the structural arrangement (10) for an access window (30) to a fuel tank (20) with composite coating (40) further comprising a continuous metal frame (31) disposed on an internal portion of the fuel tank (20), fastened to the composite coating (40) internally and perimetrally circumventing the access window (30), the continuous metal frame (31) being cooperative with the external lid (11) in the conduction of an electric current.

12 Claims, 8 Drawing Sheets

(56) References Cited

U.S. PATENT DOCUMENTS

| | | | |
|---|---|---|---|
| 7,576,966 B2* | 8/2009 | Heeter | 361/215 |
| 8,443,575 B1* | 5/2013 | Tanner et al. | 52/784.1 |
| 2005/0281999 A1* | 12/2005 | Hofmann et al. | 428/304.4 |
| 2007/0207421 A1* | 9/2007 | Heeter | 431/22 |
| 2009/0166473 A1* | 7/2009 | Zuniga Sagredo | 244/129.4 |
| 2011/0250626 A1* | 10/2011 | Williams et al. | 435/18 |
| 2013/0027835 A1* | 1/2013 | West et al. | 361/216 |
| 2013/0205667 A1* | 8/2013 | Pontes et al. | 49/70 |
| 2014/0223829 A1* | 8/2014 | Korenaga et al. | 49/483.1 |

\* cited by examiner

STRUCTURAL ARRANGEMENT FOR ACCESS WINDOW TO FUEL TANK WITH COMPOSITE COATING

The present invention pertains to a structural arrangement for access window to a fuel tank, particularly applied to fuel tanks with composite coating, endowed with means for preventing sparking inside the tank, having an arrangement which prevents the accumulation of fuel at the tank access window and endowed with protection elements on the edges of the tank coating during maintenance.

DESCRIPTION OF THE STATE OF THE ART

Aircraft comprise specific compartments for storing fuel which will be used during flight. These compartments are the fuel tanks disposed in portions designed in the aircraft such as, for example, inside the wings.

The fuel tanks of an aircraft should comprise access windows for the maintenance team, in order to inspect the inner surface of the tanks.

As known in the state of the art, these windows or inspection orifices are made so as to enable the entry of persons and access to the internal space of the tank, and are also endowed with a lid that guarantees the hermetic closure of this compartment. Generally these openings comprise a double lid, formed by a metal external access lid and internal external access lid which is also made of metal or a plain lid, formed by a metal access lid and a retaining ring of the metal access lid.

However, aircraft structures are more and more often made of composite materials, such as the wing and its structures which form the very tank disposed on the inside thereof. Accordingly, certain drawbacks are noted in the structural arrangement of access windows or inspection orifices used today, the main drawbacks being the lack of safety in the event of lightning and sparking to the fuel tank when the wing of the aircraft is made of composite material, the accumulation of fuel in the inner surface of the internal access lid and the protection of the edges of the coating of the wing against possible physical damage caused during maintenance.

With a view to solving the problem of sparking and electric discharge in these structural parts of the aircraft made of composite, document U.S. Pat. No. 7,576,966 describes a system and a method pertaining to protection against lightning, with the objective of preventing sparking and arcing inside a fuel tank made of composite material when it is subjected to electrical discharge from lightning.

Accordingly, this method has a link between the tank access lid and the walls (coating) of this tank which provides direction for the electrical discharge of a bolt of lightning when it strikes the structure of the aircraft, particularly on the tank access lid. This link is formed by an electric bond disposed between the tank coating and the tank access door and by an electrical insulation layer disposed directly in the internal portion of the tank structure. The electric bond creates a path for the electric current to flow from the access lid to the tank coating, preventing this electric current from being directed towards the internal region of the tank, where it would then enter into contact with the fuel. The insulating layer assists to insulate the internal portion of the tank.

Therefore, when lightning strikes the tank access door, the electric current generated flows freely through an engagement ring disposed on a fastener of this lid to the tank coating, passing through the electric bond which is installed between the tank access door and the tank coating. Consequently, the current is prevented from entering into the tank and also sparking in the internal parts of the tank is prevented.

Although preventing the problem of sparking inside the fuel tank, the solution described in document U.S. Pat. No. 7,576,966 can only be applied to lids or plain access doors of the tank and does not prevent the risk of damage to the edge of the tank coating during maintenance.

Document US 2009/0166473, in turn, describes a lid for access orifices to the fuel tank of an aircraft, for aircraft structures made of composite materials, particularly carbon fiber. Reinforcers are positioned on the coating panel with the objective of providing structural reinforcement to this coating and uniform support for the internal and external lids of the access orifice to the fuel tank. Sealing elements can be added between the lids, however, the objective of this arrangement is to provide structural reinforcement to the tank access orifice and is not focused on preventing sparking inside the tank, in the hypothesis that the access lid should receive an electrical discharge caused by lightning, for example.

Thus, in spite of the current studies designed to remedy the drawbacks noted in the structural arrangement of access windows or inspection orifices of aircraft tank structures made of composite materials, it is noted that there is no solution to prevent sparking inside the fuel tank and which also simultaneously prevents the accumulation of fuel on the inner surface of the internal access lid and provides protection for the edges of the coating against possible damage caused during maintenance.

OBJECTIVES OF THE INVENTION

The objective of the present invention is to provide a structural arrangement for access window to a fuel tank made of composite material capable of preventing sparking inside the tank in the event of an electrical discharge on the aircraft.

It is also an objective of the present invention to provide a structural arrangement for access window to a fuel tank made of composite material which prevents accumulation of fuel at the tank access window.

Another objective of the present invention is to provide a structural arrangement for access window to a fuel tank made of composite material capable of protecting the edges of the tank coating during maintenance.

BRIEF DESCRIPTION OF THE INVENTION

The object of the invention is a structural arrangement for access window to a fuel tank with composite coating, this structural arrangement comprising an external lid associated to the access window by fastening means, the structural arrangement for access window to the fuel tank with composite coating further comprising a continuous metal frame disposed on an internal portion of the fuel tank, fastened to the composite coating internally and perimetrally circumventing the access window, a continuous metal frame being cooperative with the external lid in the conduction of an electric current.

BRIEF DESCRIPTION OF THE DRAWINGS

The present invention shall now be described in greater detail based on an exemplary execution represented in the drawings. The drawings show.

DETAILED DESCRIPTION OF THE DRAWINGS

Figure 1:
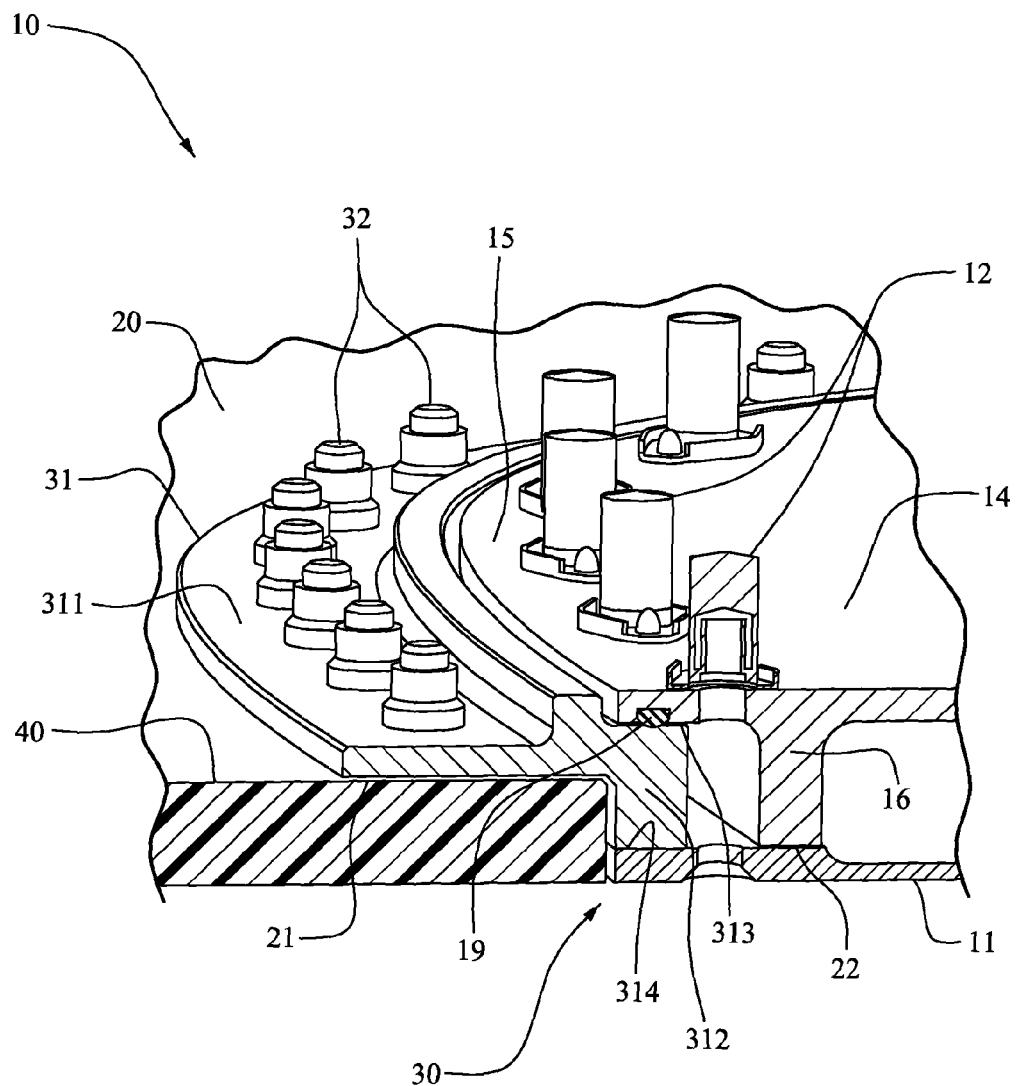
FIG. 1—is a schematic cut view of a first preferred embodiment of the structural arrangement for access window to a fuel tank with composite coating, which is the object of this invention.

As illustrated in FIGS. 1 to 8, the present invention pertains to a structural arrangement 10 for an access window 30 to the fuel tank 20 endowed with composite coating 40. This structural arrangement 10 comprises an external lid 11 associated to the access window 30 by fastening means 12, a continuous metal frame 31 disposed on an internal portion of the fuel tank 20 fastened to the composite coating 40 and internally and perimetrally circumventing the access window 30. The continuous metal frame 31 is cooperative with the external lid 11 in the conduction of an electric current, as detailed ahead.

Composite material has often been used to build aircraft structures. It generally consists of carbon fiber with resin which can be disposed in layers, laminated, or grinded and agglutinated by the resin.

Carbon fiber is a low conductive material and when in contact with metal parts or elements, it may cause sparking at the juncture during the passage or discharge of an electric current. Therefore, one of the main problems in building aircraft structures that comprise elements made of composite material joined to metal elements, is the occurrence of sparking at these junctures when subjected to the passage of an electric current. This electric current may originate from lightning striking the aircraft during flight.

For this reason, one of the objectives of the structural arrangement 10 for an access window 30 to the fuel tank 20 with composite coating 40, which is the object of this invention, is to provide a flow route for the electric current that may impact the external lid 11 or the fastening means 12, such that this electric current, when flowing through the structural arrangement 10, does not produce sparking and is safely conducted to the outside environment.

FIG. 1 illustrates a first preferred embodiment of the structural arrangement 10 for an access window 30 to the fuel tank 20 with composite coating 40, which is the object of this invention.

In this first embodiment, the access window 30 to the fuel tank 20 is disposed on a structure of the aircraft made of composite material. This structure may be the wing of the aircraft or another part which receives a fuel tank 20. Therefore, the coating 40 of the fuel tank 20 in question is made of composite material.

The access window 30 receives an external metal lid 11 and an internal lid 14 made of composite material. The continuous metal frame 31 is fastened to the composite coating 40 of the fuel tank 20 by way of fastening elements 32. More specifically, the continuous metal frame 31 comprises a first fastening portion 311 fastenably disposed on the composite coating 40 and a second protection portion 312 against mechanical damage, perpendicular to the first fastening portion 311, disposed perimetrally on the access window 30 to the fuel tank 20. With this fastening, the continuous metal frame 31 provides a continuous contour on the edges of the access window 30 by way of the second protection portion 312, and a continuous contour inside the fuel tank 20, on the composite coating 40 by way of the first fastening portion 311, as can be seen in FIGS. 2A, 2B, 3A and 3B. The first fastening portion 311 and the second protection portion 312 form a continuous metal frame 31 in a single part.

The fastening elements 32 are made of metal and may consist of screws, pins, rivets or other equivalent elements, provided they are made of metal and are capable of fastening with safety and reliability, the continuous metal frame 31 on the composite coating 40.

Between the first fastening portion 311 of the continuous metal frame 31 and the composite coating 40 there is disposed a first layer of insulating material 21. The purpose of this layer of insulating material 21 is to insulate electrically the internal portion of the fuel tank 20. The insulating material 21 used can be made of any material already commercialized, as long as it electrically insulates the inside of the tank 20 fully and reliably.

Further according to FIG. 1, the second protection portion 312 of the continuous metal frame 31 comprises a first support surface 313 disposed in the internal portion of the fuel tank 20 and is endowed with a sealing ring 19. The function of the sealing ring 19 is to prevent fuel leakage through the access window 30.

The internal lid 14, which is made of composite material, is associated to the external metal lid 11 forming a double lid. The internal lid 14 comprises a perimeter 15 which is supported on the sealing ring 19 and the flange 16 projecting perpendicularly in relation to the perimeter 15 and towards the external lid 11. Accordingly, by way of the fastening means 12, which consist of self-sealing flange-nuts or other equivalent elements, the internal lid 14 is fastened to the external lid 11 and both supported on the second protection portion 312 of the continuous metal frame 31. This is, the perimeter 15 of the internal lid 14 is supported on the sealing ring 19 positioned on the first support surface 313 of the second protection portion 312, while the external lid 11 is supported on the second support surface 314 of the second protection portion 312, opposite the first support surface 313. The self-sealing flange-nuts 12 circumvent the perimeter 15 of the internal lid 14 guaranteeing the fastening of the internal 14 and external 11 lids on the continuous metal frame 31.

Between the flange 16 of the internal lid 14 and the external lid 11 there is disposed a second layer of insulating material 22. The function of this second layer of insulating material 22 is to prevent the flow of electric current from the external lid 11 to the internal lid 14 and, accordingly, prevent sparking in the internal portion of the fuel tank 20. The insulating material 22 used can be made of any material already commercialized, as long as it electrically insulates the inside of the tank 20 fully and reliably.

When lightning strikes an aircraft, the electric current flows through the structure of the aircraft, through the paths that offer least resistance to its passage until it exits to the outside environment. As already stated, when the current flows through a juncture of components in which one is made of composite material and the other is metal, sparking may occur. If this sparking occurs in a fuel tank, the safety of the aircraft may be placed at risk.

Accordingly, the structural arrangement 10 for an access window 30 to the fuel tank 20 with composite coating 40 as illustrated in FIG. 1 and described above, imposes a flow path for the electric current which prevents the occurrence of sparking in the internal portion of the fuel tank 20.

In this sense, if lightning strikes the external metal lid 11 or the fastening means 12, according to a first preferred embodiment illustrated in FIG. 1 the electric current will be forced to continue on through the external metal lid 11, passing on to the continuous metal frame 31 by way of the second protection portion 312, following on to the first fastening portion 311 and from then to the fastening elements 32 which are made of metal and which communicate with the external portion of the coating 40. From the external portion of the coating 40 the electric current flows to other parts of the aircraft without causing risk to the fuel tank 20.

The presence of the second layer of insulating material 22 between the external lid 11 which is made of metal and the internal lid 14 which is made of composite prevents the passage of the electric current between these lids and the formation of sparking. In the same way, the positioning of the first layer of insulating material 21 between the first fastening portion 311 of the continuous metal frame 31 and the composite coating 40 prevents the passage of the electric current through these components and the occurrence of sparking.

Hence, in this structural arrangement 10 the path having least resistance through which the electric current is forced to flow is formed by the external metal lid 11, the continuous metal frame 31 and the fastening elements 32 also made of metal, to the external portion of the coating 40.

Figure 2A:
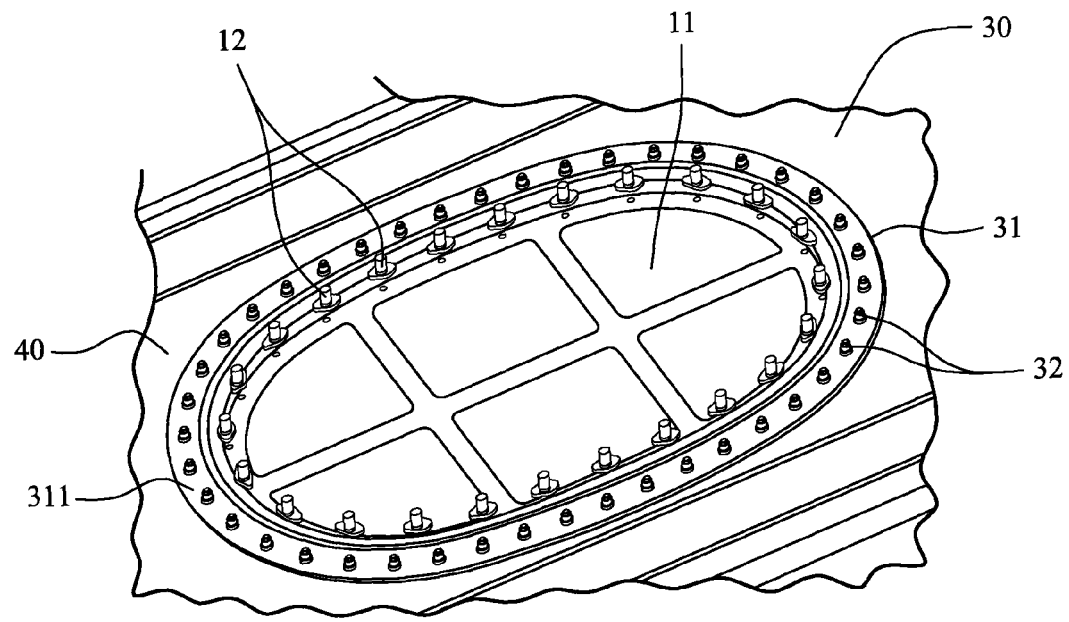
FIGS. 2A and 2B—illustrate a first preferred embodiment of the structural arrangement for access window to a fuel tank with composite coating, which is the object of this invention seen from inside the fuel tank.
Figure 2B:
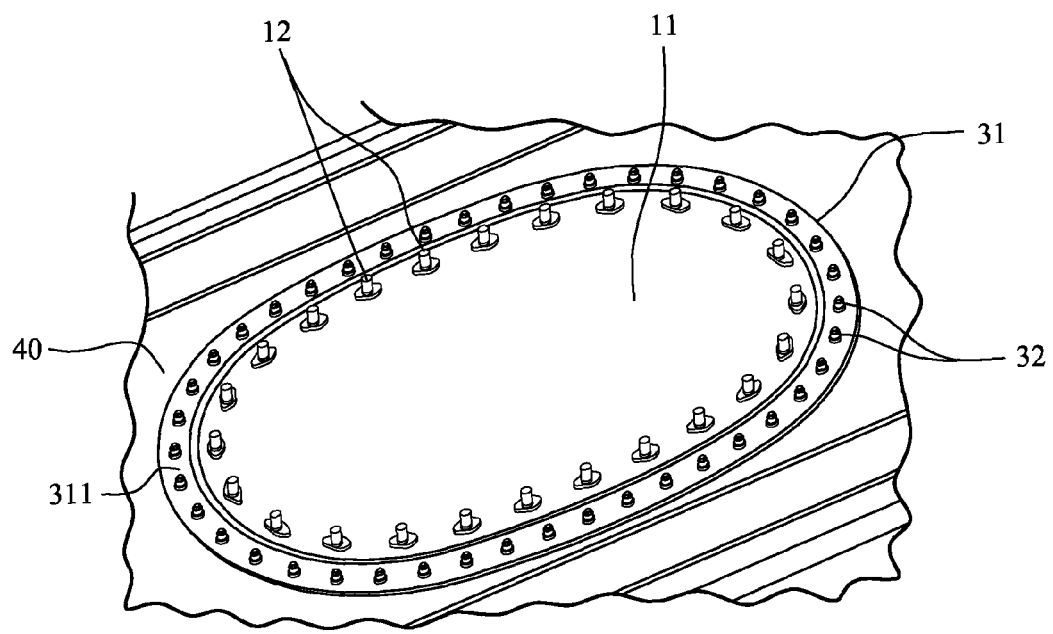

FIGS. 2A and 2B illustrate the access window 30 to the fuel tank 20 containing the structural arrangement 10, according to a first preferred embodiment illustrated in FIG. 1, seen from the internal portion of the fuel tank 20. The inner edge of the access window 30 is enveloped by the first fastening portion 311 of the continuous metal frame 31 which is supported on the composite coating 40 in the internal portion of the fuel tank 20 while the second protection portion 312 protects the corners or ends of the composite coating 40.

With this, besides preventing sparking in the internal portion of the tank 20, the structural arrangement 10 prevents physical damage to the structure of the composite coating 40 when it is necessary to withdraw the external 11 and internal 14 lids for inspection or maintenance.

Further in relation to the first preferred embodiment of this invention and as illustrated in FIG. 2B, the presence of the internal lid 14 guarantees a flat surface which does not allow fuel to accumulate at the access window 30. With this, and with the structural arrangement 10 preventing the occurrence of sparking in the internal portion of the fuel tank 20, utilization of the present invention presents a major advantage.

Figure 3A:
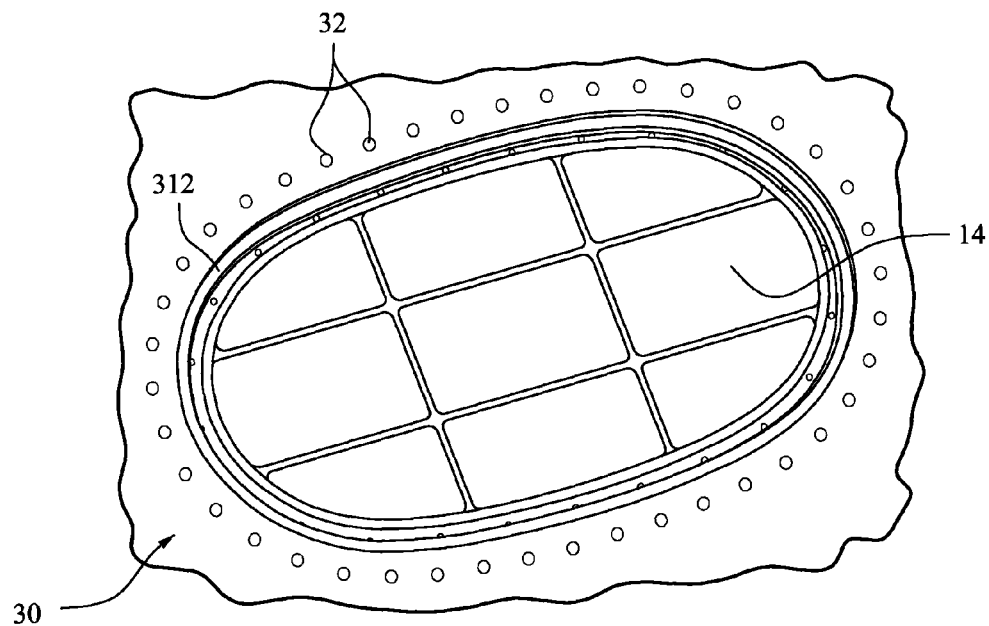
FIGS. 3A and 3B—illustrate a first preferred embodiment of the structural arrangement for access window to a fuel tank with composite coating, which is the object of this invention seen from the outside the aircraft.
Figure 3B:
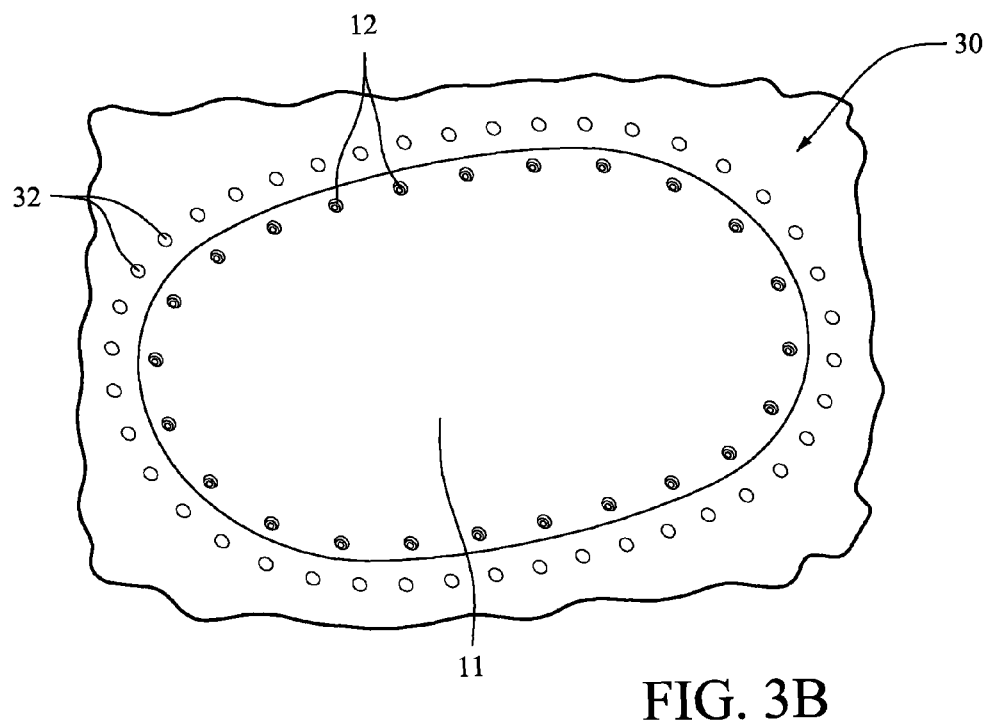

FIGS. 3A and 3B illustrate the access window 30 to the fuel tank 20 containing the structural arrangement 10, according to a first preferred embodiment illustrated in FIG. 1, seen from the external portion of the aircraft. These views reveal that the fastening elements 32 of the continuous metal frame 31 traverse the coating 40 allowing contact with an external portion of the coating 40. For this reason, these metal fastening elements 32 jointly with the continuous metal frame 31 cooperate in the conduction of the electric current to the external environment.

Figure 4:
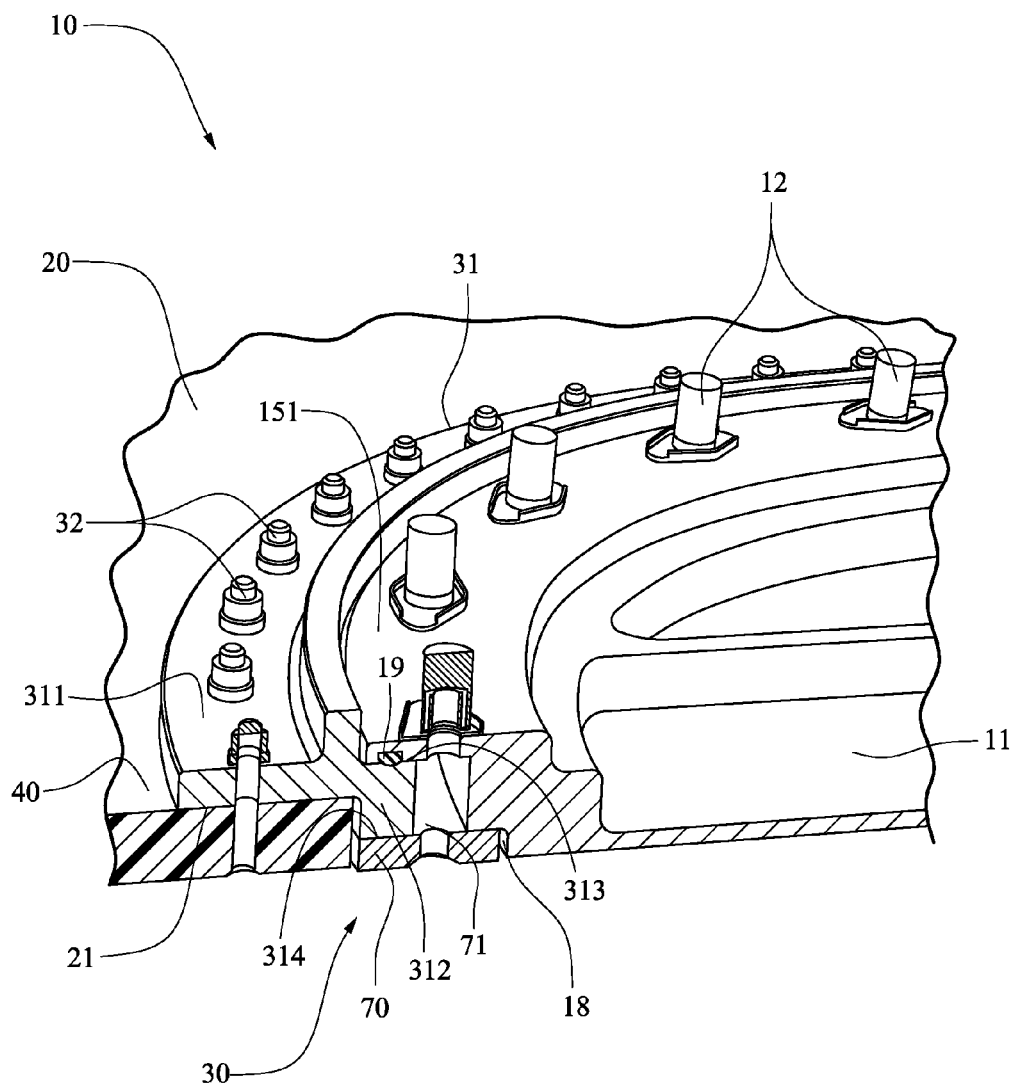
FIG. 4—is a schematic cut view of a second preferred embodiment of the structural arrangement for access window to the fuel tank with composite coating, which is the object of this invention.

FIG. 4 illustrates a second preferred embodiment of the structural arrangement 10 for an access window 30 to the fuel tank 20 with composite coating 40, which is the object of this invention.

Just as in the first embodiment, in this second embodiment the access window 30 to the fuel tank 20 is disposed on a structure of the aircraft made of composite material. This structure may be the wing of the aircraft or another part which receives a fuel tank 20. Therefore, the coating 40 of the fuel tank 20 in question is made of composite material.

The main difference between a first embodiment described above and illustrated in FIG. 1 and a second embodiment, lies in the fact that the access window 30 only receives the external metal lid 11, that is, in this second embodiment there is no internal lid 14. Accordingly, the external metal lid 11 presents a specific form which enables the reliable closure of the access window 30.

The continuous metal frame 31 is as described in the first embodiment and, therefore, bears the same characteristics of form and function.

The fastening elements 32 are also made of metal and may consist of screws, pins, rivets or other equivalent elements, provided they are made of and capable of fastening with safety and reliability, the continuous metal frame 31 on the composite coating 40.

Between the first fastening portion 311 of the continuous metal frame 31 and the composite coating 40 there is disposed a layer of insulating material 21 with the purpose of electrically insulating the internal portion of the fuel tank 20. The insulating material 21 used can be any material already commercialized, as long as it electrically insulates the inside of the tank 20 fully and reliably.

As can be seen in FIG. 4, the second protection portion 312 of the continuous metal frame 31 comprises a first support surface 313 disposed in the internal portion of the fuel tank 20 and endowed with a sealing ring 19. The function of the sealing ring 19 is to prevent fuel leakage through the access window 30.

In this second preferred embodiment the external metal lid 11 comprises a perimeter 151 which is supported on the sealing ring 19 positioned on the first support surface 313 of the second protection portion 312, and a recess 18 disposed on a surface opposite that of the perimeter 151. This recess 18 is parallel to the second support surface 314 of the second protection portion 312 and continuous along the perimeter of the access window 30.

On a second support surface 314 of the second protection portion 312 and the recess 18 of the external lid 11 there is supported a metal fastening ring 70, whose function is to enable the fastening of the external lid 11 on the continuous metal frame 31 by way of the fastening means 12, which consist of self-sealing flange-nuts or other equivalent elements.

A conductive web 71 is positioned between the second support surface 314 of the second protection portion 312 and the recess 18 of the external lid 11 and the fastening ring 70. The function of this conductive web is to provide a good path for conducting the electric current between the external lid 11 and the continuous metal frame 31.

The structural arrangement 10 for an access window 30 to the fuel tank 20 with composite coating 40 illustrated in FIG.

4 imposes a flow path for the electric current which prevents the occurrence of sparking in the internal portion of the fuel tank 20.

In this sense, if lightning strikes the lid 11, on the fastening ring 70 or on the fastening means 12, according to a second preferred embodiment illustrated in FIG. 4 the electric current will be forced to follow on through the external metal lid 11, passing on to the second protection portion 312 of the continuous metal frame 31 by way of the metal fastening ring 70 assisted by the conduction web 71, following on to the first fastening portion 311 of the continuous metal frame 31 and from there to the fastening elements 32 which are made of metal and which communicate with the external portion of the coating 40. From the external portion of the coating 40 the electric current flows to other parts of the aircraft without causing risk to the fuel tank 20.

The presence of a layer of insulating material 21 between the first fastening portion 311 of the continuous metal frame 31 and the composite coating 40 prevents the passage of the electric current through these components and the occurrence of sparking.

Hence, in this structural arrangement 10 the path of least resistance through which the electric current is forced to flow is formed by the external metal lid 11, the fastening ring 70 with the assistance of the conduction web 71, the continuous metal frame 31 and the fastening elements 32 also made of metal, to the external portion of the coating 40.

Additionally, in this second preferred embodiment the continuous metal frame 31 provides protection for the edges of the coating 40 during inspection or maintenance.

Figure 5:
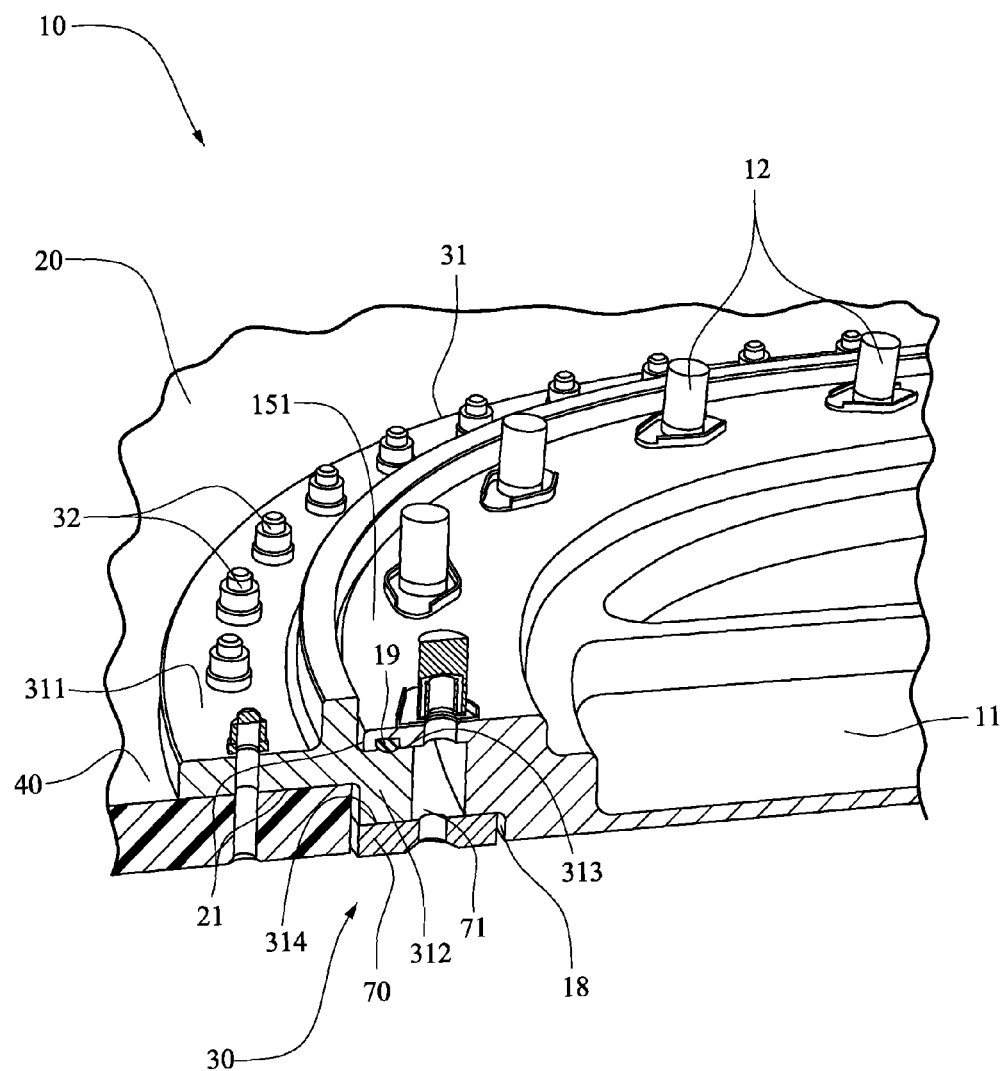
FIG. 5—is a schematic cut view of a third preferred embodiment of the structural arrangement for access window to the fuel tank with composite coating, which is the object of the present invention.

FIG. 5 illustrates a third preferred embodiment of the structural arrangement 10 for an access window 30 a fuel tank 20 with composite coating 40, which is the object of the present invention.

Also in this third embodiment the access window 30 to the fuel tank 20 is disposed on a structure of the aircraft made of composite material. This structure may be the wing of the aircraft or another part that receives a fuel tank 20. Therefore, the coating 40 of the fuel tank 20 in question is made of composite material.

The access window 30 only receives the external lid 11 and in this third embodiment, the external lid 11 is made of composite material. The form of this external lid 11 made of composite is the same as the external metal lid 11 of the second preferred embodiment, whereby enabling reliable closure of the access window 30.

The continuous metal frame 31 is as described in the prior embodiments and, therefore, bears the same characteristics of form and function.

The fastening elements 32 are also made of metal and may consist of screws, pins, rivets or other equivalent elements, provided they are made of metal and capable of fastening with safety and reliability, the continuous metal frame 31 on the composite coating 40.

In this third preferred embodiment the external lid 11 made of composite comprises a perimeter 151 which is supported on the sealing ring 19 positioned on the first support surface 313 of the second protection portion 312, and a recess 18 disposed on a surface opposite that of the perimeter 151. This recess 18 is parallel to the second support surface 314 of the second protection portion 312 and continuous along the perimeter of the access window 30.

On the second support surface 314 of the second protection portion 312 and the recess 18 of the external lid 11 there is supported a metal fastening ring 70, whose function is to allow the fastening of the external lid 11 made of composite on the continuous metal frame 31 by way of the fastening means 12, which consist of self-sealing flange-nuts or other equivalent elements.

A conductive web 71 is positioned between the second support surface 314 of the second protection portion 312 and the recess 18 of the lid 11 made of composite and the fastening ring 70.

In this embodiment, the function of this conductive web is to provide a good path for conducting the electric current between the external lid 11 and the continuous metal frame.

Since the external lid 11 is made of composite material, in this third preferred embodiment of the structural arrangement 10 a layer of insulating material 21 is disposed between the first fastening portion 311 of the continuous metal frame 31 and the composite coating 40 and there is also a layer of insulating material 21 between the side wall of the perimeter 151 of the external lid 11 and the continuous metal frame 31 wherein this layer of insulating material 21 also extends between the support surface 313 of the metal frame 31 and the lower portion of the perimeter 151 of the lid 11. This prevents the passage of the electric current of the external lid 11 to the continuous metal frame 31, whereby preventing the occurrence of sparking on this interface.

Therefore, in this structural arrangement 10 of the third preferred embodiment the path of least resistance through which the electric current is forced to flow is formed by the external lid 11 made of composite, the fastening ring 70 with the assistance of the conduction web 71, the continuous metal frame 31 and the fastening elements 32 also made of metal, to the external portion of the coating 40.

Figure 6:
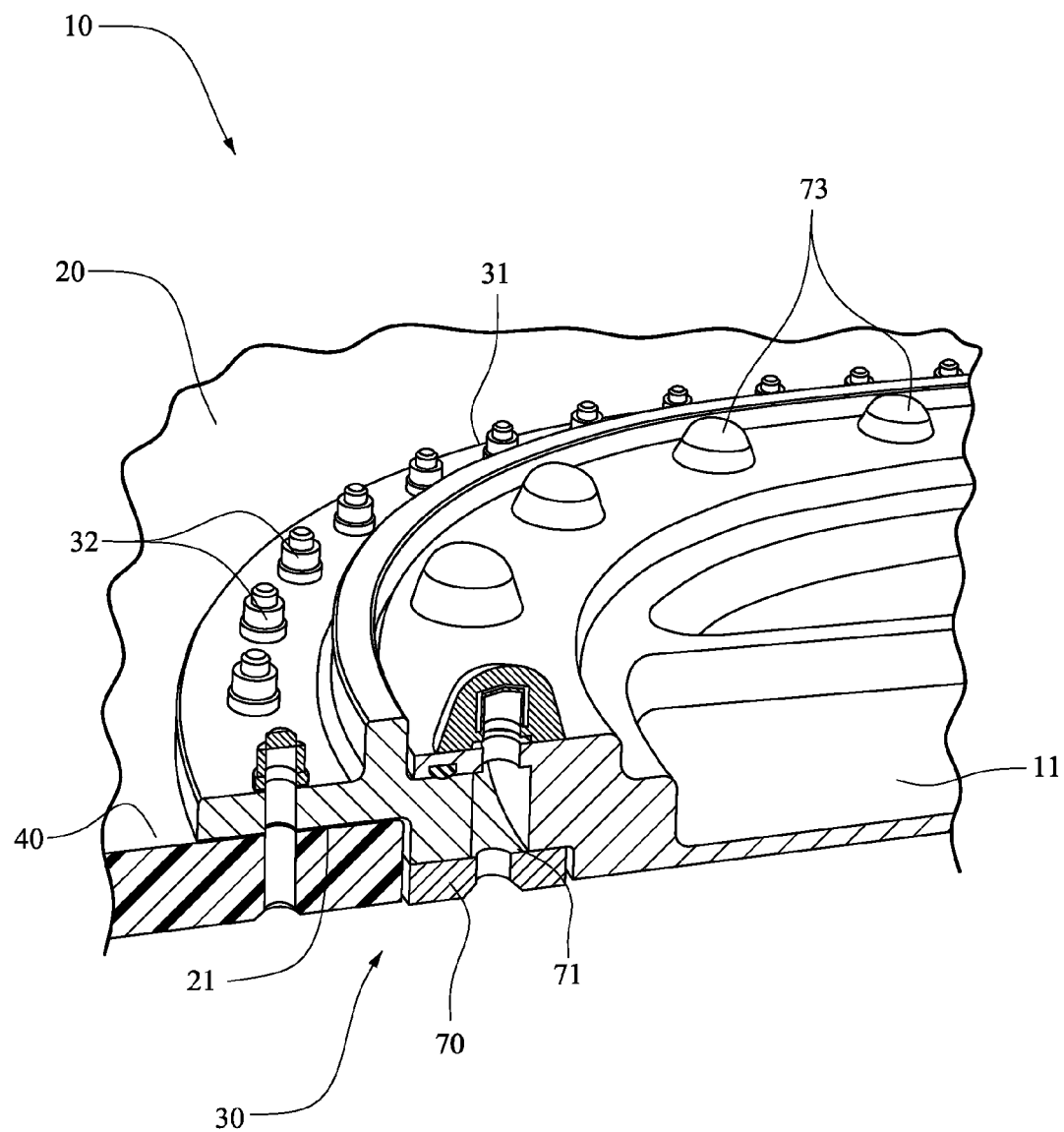
FIG. 6—is a schematic cut view of a fourth preferred embodiment of the structural arrangement for access window to the fuel tank with composite coating, which is the object of this invention.

FIG. 6 illustrates a fourth preferred embodiment of the structural arrangement 10 for an access window 30 to the fuel tank 20 with composite coating 40, which is the object of the present invention.

In this fourth embodiment, the external lid 11 is made of metal and the other components are as described in the second preferred embodiment illustrated in FIG. 4. The difference in this fourth embodiment in relation to the second embodiment is the fact that the self-sealing flange-nuts 12 which fasten the external lid 11 are replaced by threaded inserts 73 on the external lid 11 itself (FIG. 6).

Figure 7:
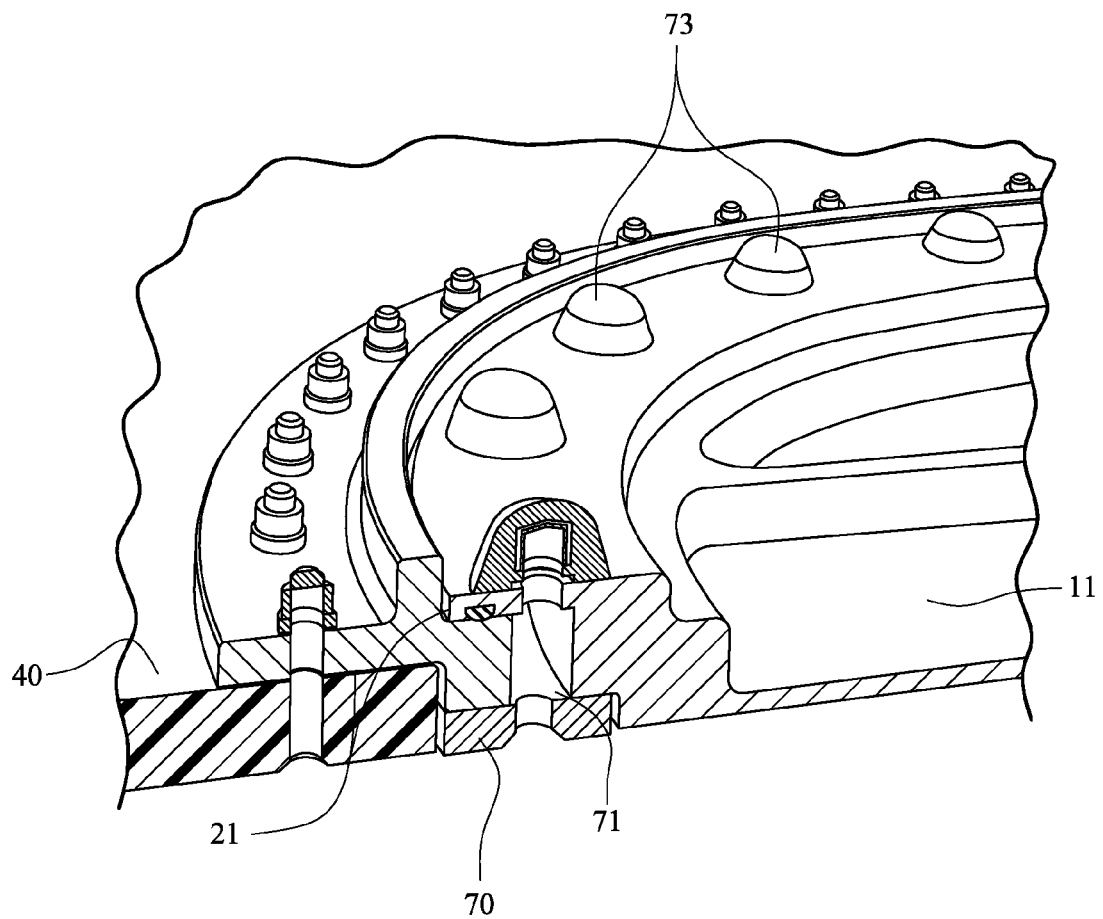
FIG. 7—is a schematic cut view of a fifth preferred embodiment of the structural arrangement for access window to the fuel tank with composite coating, which is the object of this invention.

FIG. 7 illustrates a fifth preferred embodiment of the structural arrangement 10 for an access window 30 to the fuel tank 20 having composite coating 40, which is the object of the present invention.

In this embodiment, the external lid 11 is made of composite material and the other components are as described in the third preferred embodiment illustrated in FIG. 5. The difference in this fifth embodiment in relation to the third embodiment is the fact that the self-sealing flange-nuts 12 which fasten the external lid 11 are replaced by threaded inserts 73 on the external lid 11 itself (FIG. 7).

Figure 8:
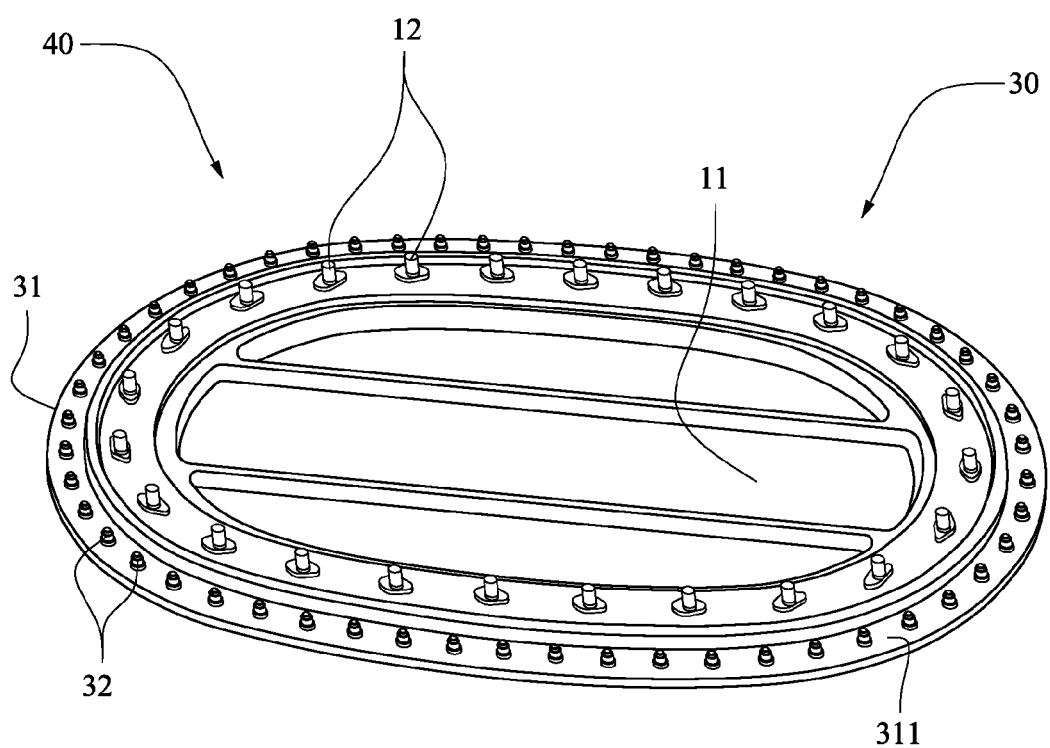
FIG. 8—is a schematic view in perspective of the second or third preferred embodiment of the structural arrangement for access window to a fuel tank with composite coating, which is the object of this invention seen from inside the fuel tank.

FIG. 8 illustrates a second or third preferred embodiment of the structural arrangement 10 for an access window 30 to the fuel tank 20 with composite coating 40 seen from the internal portion of the fuel tank 20.

The inner edge of the access window 30 is enveloped by the first fastening portion 311 of the continuous metal frame 31 which is supported on the composite coating 40 in the internal portion of the fuel tank 20 while the second protection portion 312 protects the corners or ends of the composite coating 40.

Besides preventing sparking in the internal portion of the tank 20, the structural arrangement 10 prevents damage to the composite coating 40 when it is necessary to withdraw the external lid 11 for maintenance or inspection.

For the fourth and fifth embodiments of this invention, the inner surface of the external lid 11 is the same, with the exception of the regions which form the threaded inserts 73, the difference being that the self-sealing flange-nuts are replaced by these threaded inserts 73 formed on the external lid 11 itself.

Thus, the structural arrangement 10 prevents the occurrence of sparking in the internal portion of the fuel tank 20 and decreases the accumulation of fuel at the access window 30 (in the case of the first preferred embodiment) and also provides protection against physical damage to the edge of the composite coating 40.

Having described an example of a preferred embodiment, it should be understood that the scope of the present invention encompasses other possible variations, being limited only by the content of the accompanying claims, potential equivalents included therein.

The invention claimed is:

1. A structural arrangement for an access window of a fuel tank with a composite coating, the structural arrangement comprising:
   an external lid associated with and fastened to the access window;
   a continuous metal frame disposed on an internal portion of the fuel tank which is fastened to the composite coating so as to internally and perimetrally circumvent the access window; and
   the continuous metal frame cooperative with the external lid in the conduction of an electric current, wherein
   the continuous metal frame comprises a first fastening portion fastenably disposed on the composite coating and a second protection portion perpendicular to the first fastening portion and disposed perimetrally on the access window to the fuel tank.

2. The structural arrangement as claimed in claim 1, wherein the continuous metal frame is fastened to the composite coating by way of metal fastening elements which conduct the electric current to an external portion of the composite coating.

3. The structural arrangement as claimed in claim 2, wherein the external lid is in contact with the second protection portion of the continuous metal frame connected to the first fastening portion of the continuous metal frame and to the fastening elements so as to define a path for conducting the electric current to an external portion of the composite coating.

4. The structural arrangement as claimed in claim 1, wherein the first fastening portion is fastened to the composite coating by way of metal fastening elements which conduct the electric current to an external portion of the composite coating.

5. The structural arrangement as claimed in claim 4, further comprising a first layer of insulating material disposed between the first fastening portion of the continuous metal frame and the composite coating.

6. The structural arrangement as claimed in claim 1, wherein the second protection portion of the continuous metal frame comprises a first support surface disposed in the internal portion of the fuel tank, the first support surface including a sealing ring.

7. The structural arrangement as claimed in claim 6, further comprising an internal lid associated with the external lid (11) and fastened to the access window, the internal lid having a perimeter portion supported on the sealing ring and a flange supported on the external lid.

8. The structural arrangement as claimed in claim 7, further comprising a second layer of insulating material disposed between the flange of the internal lid and the external lid.

9. The structural arrangement as claimed in claim 6, wherein the second protection portion of the continuous metal frame comprises a second support surface opposite the first support surface, wherein the external lid is supported on the second support surface.

10. The structural arrangement as claimed in claim 6, wherein the second protection portion of the continuous metal frame comprises a second support surface opposite the first support surface, and (313) on which a fastening ring supported on the second support surface.

11. The structural arrangement as claimed in claim 10, further comprising a recess defined by the external lid and the fastening ring, and a conductive web positioned between the second support surface of the second protection portion and the recess defined by the external lid and the fastening ring.

12. The structural arrangement as claimed in claim 6, wherein the external lid includes a perimeter portion supported on the sealing ring in the internal portion of the fuel tank.

* * * * *